April 15, 1952 — I. HEINO — 2,593,027
FISH LURE
Filed May 24, 1949
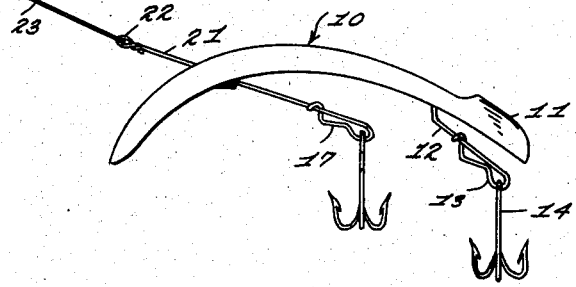
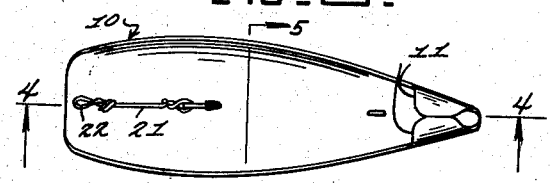
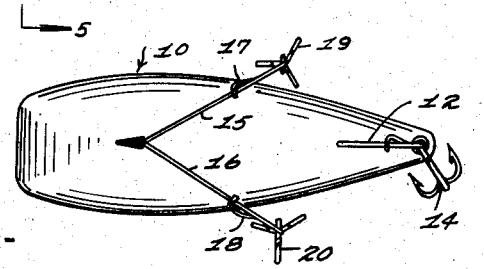
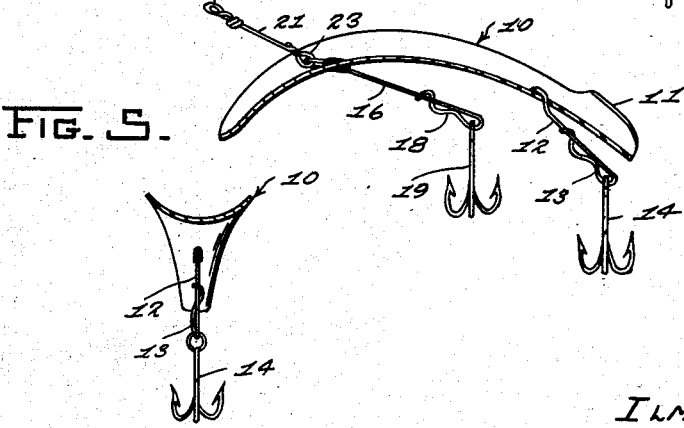
INVENTOR.
ILMARI HEINO
BY
McMorrow, Berman & Davidson
ATTORNEYS Patented Apr. 15, 1952

2,593,027

UNITED STATES PATENT OFFICE 2,593,027

FISH LURE

Ilmari Heino, Ferndale, Mich.

Application May 24, 1949, Serial No. 95,013

2 Claims. (Cl. 43—42.06)

This invention relates to fish lures, and more particularly to a spoon or spinner type lure of improved construction.

It is among the objects of the invention to provide an improved spoon type fish lure of double curvature having at its rear or trailing end a funnel formation capable of directing a jet of water rearwardly of the lure and creating a turbulence simulating the turbulence created by the tail fins of a fish, while the double curvature simultaneously imparts to the lure diving and dodging movements closely simulating the evasive actions of a fish attempting to escape an attacker, which lure is of simple and durable construction and economical to manufacture, and which carries a plurality of hooks disposed at the opposite sides and at the rear thereof, so that a fish striking at the lure will be hooked substantially regardless of the angle of approach of such fish to the lure.

Other objects and advantages will become apparent from a consideration of the following description and the appended claims in conjunction with the accompanying drawing, wherein:

Figure 1 is a side elevation of a fish lure illustrative of the invention;

Figure 2 is a top plan view of the lure illustrated in Figure 1;

Figure 3 is a bottom plan view of the lure illustrated in Figure 1;

Figure 4 is a longitudinal, medial cross-sectional view through the lure taken substantially on the line 4—4 of Figure 2; and Figure 5 is a transverse cross-sectional view taken on the line 5—5 of Figure 2.

With continued reference to the drawing, the lure comprises a body 10 of arcuate form in longitudinal cross section made of non-corrosive metal. A pair of upstanding side walls are positioned on the top of body 10 and spaced from each other and are secured to body 10 to thereby form an open ended channel. The side walls and body 10 slope inwardly from a point adjacent their mid-portions to and terminating in a point at one end of said body, and they also slope inwardly from a point adjacent their mid-portions to and terminating in a blunt end at the other end of said body.

A first upstanding tab 11 is positioned on one of the side walls of the body 10 adjacent the pointed end and and has its lower end secured to said side wall. A second upstanding tab 11 is positioned on the other of the side walls of the body 10 in confronting aligned relation with respect to the first tab and has its lower end secured to said side wall. The upper ends of tabs 11 are bent inwardly and abut each other to form with the tabs 11 a funnel for creating a jet action at the pointed end of the lure when the latter is drawn through the water. The jet of water produced by this funnel closely simulates the turbulence produced by the tail fins of a fish swimming rapidly through the water.

A hook-attaching wire 12 extends from the transversely-convex, longitudinally-concave side of the body adjacent the narrow, rear end of the body and near the front end of the funnel formation provided by the tabs 11. This wire is inclined rearwardly away from the body and is provided, at its outer end, with a hook-attaching eye 13 by means of which a triple hook 14 is dependingly supported from the lure.

Two hook-attaching wires 15 and 16 extend from the transversely-convex, longitudinally-concave side of the body 10 at a location between the wire 12 and the wide, front end of the body, and are provided, at their ends remote from the body, with hook-attaching eyes 17 and 18 respectively by means of which triple hooks 19 and 20 are secured to the lure body.

The two wires 15 and 16 are inclined rearwardly away from the lure body and diverge from each other and symmetrically from the longitudinal center line of the body.

A line-attaching wire 21 extends from the transversely-concave, longitudinally-convex side of the body substantially at the location at which the wires 15 and 16 are attached to the body, and is inclined forwardly away from the forward portion of the body 10, being substantially in longitudinal alignment with a plane including the two wires 15 and 16. This wire 21 has, at its outer end, a line-attaching eye 22 by means of which the line 23 is connected to the lure. Preferably, a swivel connection 23 is provided between the wire 21 and the lure body, so that the body can swing in various directions relative to the line-attaching wire 21.

The portion of the lure body 10 ahead of the wire 21 being curved away from this wire, causes the lure to have a diving and dodging action when it is pulled through the water by the line 23, swinging the hooks 14, 19 and 20 in various directions, and the funnel formation produces a jet which creates a turbulence in the water at the rear of the lure.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fish lure comprising a body of arcuate form in longitudinal cross section, the sides of said body sloping inwardly from its mid-portion to one end thereof and sloping inwardly from its mid-portion to and terminating in a blunt end at the other end thereof, a first upstanding tab positioned on one side of said body adjacent said one end and having its lower end secured to said body, a second upstanding tab positioned on the other side of said body in confronting aligned relation with respect to said first tab and having its lower end secured to said body, the upper ends of said tabs being bent inwardly so as to abut against each other and form a funnel for creating a jet action at said one end when the lure is drawn through the water, a hook positioned adjacent to and spaced from said one end of said body and dependingly supported therefrom, and means positioned on the top of said body adjacent to and spaced from said blunt end thereof for attaching a fish line thereto.

2. A fish lure comprising a body of arcuate form in longitudinal cross section, a pair of upstanding side walls on the top of said body and spaced from each other to thereby form an open ended channel, said side walls and body sloping inwardly from a point adjacent their mid-portions to one end thereof and sloping inwardly from a point adjacent their mid-portions to and terminating in a blunt end at the other end thereof, a first upstanding tab positioned on one of the side walls of said body adjacent said one end and having its lower end secured to said side wall, a second upstanding tab positioned on the other of the side walls of said body in confronting aligned relation with respect to said first tab and having its lower end secured to said side wall, the upper ends of said tabs being bent inwardly so as to abut against each other and form a funnel for creating a jet-action at said one end when the lure is drawn through the water, a hook positioned adjacent to and spaced from said one end of said body and dependingly supported therefrom, and means positioned on the top of said body adjacent to and spaced from said blunt end thereof for attaching a fish line thereto.

ILMARI HEINO.

REFERENCES CITED

The following references are of record in the file of this patent:

UNITED STATES PATENTS

| Number | Name | Date |
|---|---|---|
| 962,319 | Crosby | June 21, 1910 |
| 1,197,820 | Guise | Sept. 12, 1916 |
| 2,180,918 | Verzi | Nov. 21, 1939 |
| 2,375,290 | Docteur | May 8, 1945 |
| 2,484,747 | Russell | Oct. 11, 1949 |
| 2,538,703 | Perry | Jan. 16, 1951 |